Jan. 1, 1929.
W. D. KENDRICK
1,697,278
ANGLE COCK
Filed March 29, 1927
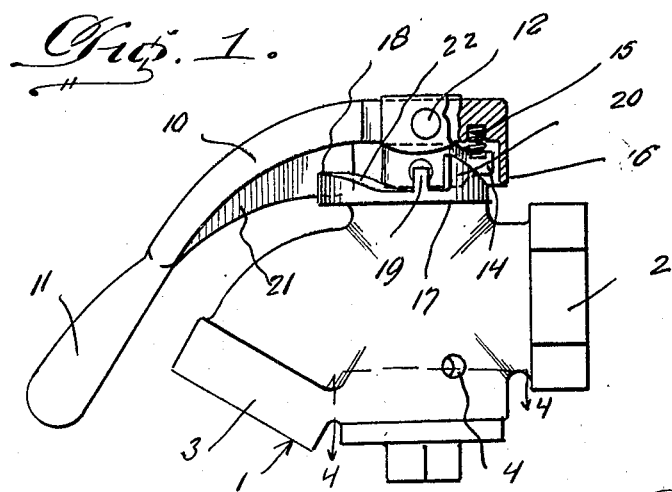
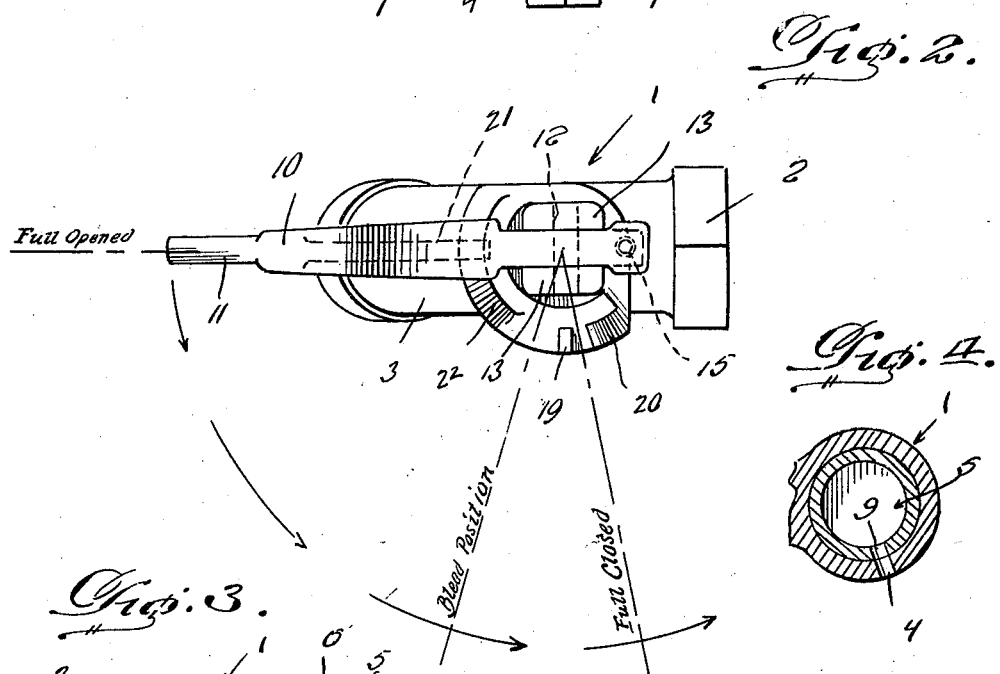
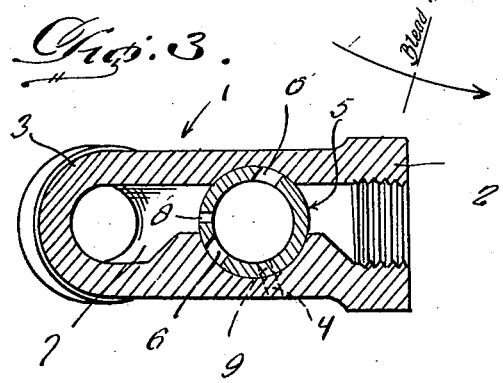
Inventor
William D. Kendrick
By Clarence A. O'Brien
Attorney Patented Jan. 1, 1929.

1,697,278

UNITED STATES PATENT OFFICE.

WILLIAM D. KENDRICK, OF PHOENIX, ARIZONA, ASSIGNOR TO SAFETY LOCK HANDLE AND VALVE COMPANY, OF PHOENIX, ARIZONA, A CORPORATION OF DELAWARE.

ANGLE COCK.

Application filed March 29, 1927. Serial No. 179,331.

The present invention relates to an improved structure frequently referred to as an air-brake valve, but being better known, in actual practice, as an angle cock, the same being particularly, but not necessarily, designed for use in connection with a train pipe and a complemental hose connection.

Before attempting to describe the structure or the advantages of the present device, it is desired to point out that the present device is an improvement upon Patents Numbers 943,554 and 1,509,816 granted to me on December 14, 1909, and September 23, 1924, respectively. Incidentally, the improvement in this particular application consists in the carrying forward of the ideas and constructions embodied in both of these patents.

Reference being had to prior Patent 943,554 of December 14, 1909, it will be observed that the gist of the invention here is in the provison of a bleed orifice in the valve casing, together with the provision of auxiliary bleed cuts formed in a hollow tubular rotary valve and adapted to be registered with the main casing passage and the orifice respectively for the purpose of allowing air to escape from the hose connection in order to relieve pressure and to prevent injury to the attendant.

The construction in this patent comprehended, broadly speaking, a three-way valve which could be placed in full open position, in full closed position, or in intermediate bleed position.

The foregoing patented arrangement would carry forward with the construction illustrated in my second Patent No. 1,509,816. The feature of the latter patent was the provision of a novel operating handle and retaining means therefor such as serves to positively hold the handle in any one of the three positions just enumerated.

The invention of the present application is a still further step wherein the ideas of the first two patents are incorporated to a certain extent, and amplified by the presence of a new feature such as renders the valve substantially fool-proof. For example, in the present construction I provide the rotary hollow plug having the main and auxiliary ports, the bleed orifice in the casing, and an operating handle together with cooperating means between the casing and the handle for holding the latter positively in any one of its three positions. In addition, however, the operating means is so made as to provide a more positive retainer and at the same time provide a substantially compulsory stop of the operating handle in the bleed position before it can be moved to a closed position. It frequently happens that a "green" attendant will encounter accidents even when using a valve of the construction illustrated in my Patent 1,509,816, for the reason that the attendant will disengage the handle from full open position and its retaining means and will move it completely around to full closed position, without stopping at the intermediate bleed position. Hence, even though the air in the train pipe is cut off, a certain amount of air will be backed up in the hose and when the hose connections are parted, they will fly apart with sufficient force to subject the attendant to injury. In the present improvement, however, it is substantially compulsory to momentarily stop the swing of the operating handle at the intermediate bleed position to allow discharge of the air from the hose coupling and so prevent consequent injury to the operator.

The latter is the outstanding advantage and feature of this invention and the particular details in their relative arrangement and association which serve to permit this result to be had will be rendered clear from the following description and accompanying drawing.

In the accompanying drawings, in which like reference characters are employed to designate like parts throughout the same:—

Figure 1 is a side view with the greater portion in elevation and a small portion in section showing the completed structure and representing the handle in full open position, Fig. 2 is a top plan view of Fig. 1 with indicating lines representing the three stopping points for the operating handle, Fig. 3 is a longitudinal section through the casing and rotary plug, and Fig. 4 is a horizontal section taken approximately upon the line 4—4 of Fig. 1.

Referring now to the drawings in detail, it will be seen that the reference character 1 designates the valve casing which is in the form of a metal casting of the usual angular configuration. The end portion 2 is adapted to be connected with the train pipe (not shown). The opposite end 3 is adapted to be connected with the customary hose coupling (not shown). Formed in one side wall as at 4 is the air pressure bleed cut or orifice. This is disposed somewhat diagonally as represented in dotted lines in Fig. 3. In the last-named figure it will be seen that the bore of the casing is formed to accommodate a hollow cylindrical rotary plug valve 5. This valve is provided with main ports 6 to register with the passage 7 to allow unhampered flow of the air from one car to the next car through the usual hose coupling. In addition this plug is provided with auxiliary ports 8 and 9 which may be selectively made to register with the passage 7 or moved to position for closing or lapping the same. In Figure 3, the main port 6 is shown in lapped position while the ports 8 and 9 are in communication with the passage 7 and bleed port 4 respectively, this being the position of the valve when the air is to be drained from the hose.

The operating handle is represented by the reference character 10 and it will be noticed that it is bowed downwardly and provided with an appropriate handgrip 11 which extends beyond the end 3 of the casing. The opposite end of this handle is pivoted as at 12 between the upstanding furcations 13 on the protruding end of the valve stem. Attention is also invited to the fact that the last-named end of the handle extends beyond the furcations in spaced relation to a lug 14 and a strong coiled spring is interposed between this extended end and the lug and seated in sockets formed in these portions. The spring is represented by the reference character 15. In this connection, particular attention is invited to the fact that the extended end of the handle carries a depending shield 16 which operates as a guard particularly against the elements. In other words, it practically houses the spring to prevent accumulation of snow and ice thereon or between the lug and the extended end of the handle. Hence, efficient operation of the handle is insured at all times.

Attention is now directed to the fact that the extended neck portion on the intermediate top of the casing is provided with an integral out-standing segmental flange 17 provided with three upstanding shoulders 18, 19 and 20. Formed on the under side of the curved portion of the handle 10 is a rib 21, the inner end of which cooperates with each shoulder in an obvious manner. Moreover, the metal from which the flange is formed is thickened as at 22 in order to provide a runner upon which the rib 21 may slide.

With the foregoing arrangement it is obvious that when the handle is in the full open position represented in Figure 2, the ports 6 in the rotary valve 5 are then in alinement with the passage 7, allowing free flow of air from the train pipe through the valve and into the hose coupling. Now, when an attendant grasps the hand-grip and lifts upwardly upon the handle 10, the extended end portion will be resisted in its downward movement by the spring. This makes it necessary to exert a rather strong upward lift upon the handle in order to cause the rib 21 to clear the shoulder 18. The rib is then allowed to rest upon the runner 22 and the handle is swung around in the direction from left to right, thus engaging the shoulder stop 19. This is the bleed position, as represented and it becomes necessary to again lift the handle to clear the stop in order to bring it to the final stop 17. By the time this intermediate stop position is reached and the handle is lifted up and over this stop and brought against the remaining stop 17, sufficient air is allowed to drain from the hose coupling to reduce the pressure sufficiently to guard against injury to the operator in parting the coupling.

Numerous advantages seem to accompany this arrangement and these will be plainly evident to persons familiar with inventions of this character. It is hardly thought necessary to list or itemize the various advantages, such for instance as saving of air, safety features, et cetera. On the other hand, it is thought that a clear understanding of the invention and its operation will be had after reading the description connected with the drawing, and hence a more lengthy description is thought unnecessary.

While the preferred embodiment of the invention has been shown and described, it is to be understood that minor changes coming within the field of invention claimed may be resorted to if desired.

I claim:—

1. In a safety angle cock of the class described, in combination, a casing having a main passage extending therethrough and a pressure bleed orifice in one side in communication with said passage, a rotary plug valve in said casing having main ports for registry with the main passage and auxiliary ports for registry with said orifice and passage respectively, an operating handle for the valve, an outstanding segmental flange formed integral with said casing and beneath said handle, a rib carried by the underside of the handle, and three upstanding separate stops formed on the upper side of said flange for positively stopping the handle in full open position, in intermediate bleed position, and in final full closed position, said handle being provided beyond the pivot and on one side with an extension, an outstanding lug on the valve beneath said extension, and a spring interposed between said extension and lug.

2. In a safety angle cock of the class described, in combination, a casing having a main passage extending therethrough and a pressure bleed orifice in one side in communication with said passage, a rotary plug valve in said casing having main ports for registry with the main passage and auxiliary ports for registry with said orifice and passage respectively, an operating handle for the valve, an outstanding segmental flange formed integral with said casing and beneath said handle, a rib carried by the underside of the handle, and three upstanding separate stops formed on the upper side of said flange for positively stopping the handle in full open position, in intermediate bleed position, and in final full closed position, said handle being provided beyond the pivot and on one side with an extension, an outstanding lug on the valve beneath said extension, and a spring interposed between said extension and lug, together with a depending shield carried by the extension on said handle and enclosing said spring and lug to provide a weather guard.

In testimony whereof I affix my signature.

WILLIAM D. KENDRICK.